United States Patent
Roh et al.

(10) Patent No.: US 7,769,977 B2
(45) Date of Patent: Aug. 3, 2010

(54) APPARATUS AND METHOD OF MANAGING STORAGE SPACE THROUGH TIME-VARIANT CONSUMPTION ESTIMATION

(75) Inventors: Dong-hyun Roh, Suwon-si (KR); Yong-sung Kim, Suwon-si (KR); Tae-ung Jung, Suwon-si (KR); So-hee Jang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 698 days.

(21) Appl. No.: 11/653,900

(22) Filed: Jan. 17, 2007

(65) Prior Publication Data
US 2007/0186064 A1 Aug. 9, 2007

(30) Foreign Application Priority Data
Feb. 7, 2006 (KR) .................. 10-2006-0011817

(51) Int. Cl.
*G06F 12/00* (2006.01)
(52) U.S. Cl. .................. 711/170; 711/154
(58) Field of Classification Search .......... None
See application file for complete search history.

(56) References Cited
U.S. PATENT DOCUMENTS
2005/0076043 A1* 4/2005 Benedetti et al. ......... 707/100
2007/0033365 A1* 2/2007 Vaidyanathan et al. ...... 711/170

FOREIGN PATENT DOCUMENTS
| JP | 2001-257950 A | 9/2001 |
| JP | 2004-153728 A | 5/2004 |
| KR | 10-2001-0052042 A | 6/2001 |

* cited by examiner

*Primary Examiner*—Jack A Lane
(74) *Attorney, Agent, or Firm*—Sughrue Mion, PLLC

(57) ABSTRACT

An apparatus and a method for managing a storage space through time-variant consumption estimation. More particularly, an apparatus and a method for managing a storage space through time-variant consumption estimation that estimates consumption of an entire storage space when a user instructs program editing, program recording or reserved recording, and so on. When there is a possibility that the estimated consumption exceeds a predetermined value, immediately providing a user with information indicating that the storage space is lacking. The apparatus includes a storage unit storing contents in the storage space, a consumption estimation unit estimating time-variant consumption of the storage space, a contents management unit deleting at least a portion of the contents or storing at least a portion of additionally input contents according to the estimation result, and an output unit outputting the deletion or storage result.

24 Claims, 8 Drawing Sheets

APPARATUS AND METHOD OF MANAGING STORAGE SPACE THROUGH TIME-VARIANT CONSUMPTION ESTIMATION

CROSS REFERENCE TO RELATED APPLICATION

This application claims priority from Korean Patent Application No. 10-2006-0011817 filed on Feb. 7, 2006 in the Korean Intellectual Property Office, the disclosure of which is incorporated herein by reference in its entirety.

BACKGROUND OF THE INVENTION

1. Field of the Invention

Apparatuses and methods consistent with the present invention relate to managing a storage space through time-variant consumption estimation. In particular, the present invention relates to an apparatus and a method for managing a storage space through time-variant consumption estimation that estimates consumption of an entire storage space when a user instructs program editing, program recording or reserved recording, and so on and, when there is a possibility that estimated consumption exceeds a predetermined value, immediately provides a user with information indicating that the storage space is lacking.

2. Description of the Related Art

Recently, media devices, such as PVR, Home AV center and PMP, having a mass storage device, that can store and play various contents, such as music, photographs, and motion pictures, have appeared.

Accordingly, recording, reserved recording, editing, and deletion utilizing EPG or the like are frequently performed, and the lack of storage space may occur in the media devices at any time. Accordingly, in order to solve this problem, a method of managing a storage space that can effectively cope with the lack of storage space has been in demand.

A conventional storage space management apparatus includes a user interface that receives an instruction from a user and provides the user with information, a recording processing unit that processes a recording instruction of the user, a recording reservation unit that receives and stores a reserved recording instruction of the user and requests to perform reserved recording at a prescribed time, an editing processing unit that receives an editing instruction from the user and processes the editing instruction, and receives a deletion time and a deletion instruction of stored contents from the user and transmits them to a contents management unit, the contents management unit that takes charge of storage and deletion of the contents, and a contents storage space in which the contents is actually stored.

That is, in a conventional space management method, if consumption of the storage space exceeds a predetermined value during recording of the contents, contents is to be deleted from the previously stored contents or contents is automatically deleted utilizing various kinds of meta data. Here, when the consumption of storage space exceeds the predetermined value during recording, as a method of deleting specified contents previously stored or determining contents to be deleted, there is a method that sets priorities using the meta data, such as a generation date, a latest access date, the number of play times, preservability, and preference, and sequentially deletes the previously stored contents from contents having a low priority until a required storage space is ensured.

In conventional techniques, when there is a lack of storage space, contents to be deleted are first determined.

However, in the case of manual setting, for example, when the user directly deletes the previously recorded contents, if the user does not react at the time when there is a lack of storage space, recording may be performed incorrectly.

Further, in the case of automatic setting, in which the previously recorded contents are automatically deleted according to user setting, it is difficult for a user to set deletion methods for all possible cases in advance. Accordingly, deletion is performed on the basis of a general setting, and thus it is difficult to accurately realize user preferences when the deletion is required.

Japanese Unexamined Patent Application Publication No. 2001-257950 discloses a technique that deletes a portion of previously recorded programs when the sum of the size of the previously recorded programs, the size of reserved programs to be recorded, and the size of new programs to be recorded exceeds a total recordable size. However, according to this technique, only information of the size of the storage space used for recording at the present time and the size of a storage space to be used for new recording is provided. Accordingly, estimation information of time-variant consumption of the storage space at an arbitrary time cannot be obtained.

SUMMARY OF THE INVENTION

An aspect of the present invention is to estimate the consumption of a storage space in an apparatus for managing a storage space for storing and outputting contents and to provide a user with information that indicates a lack of storage space.

Aspects of the present invention are not limited to those mentioned above, and other aspects of the present invention will be apparently understood by those skilled in the art through the following description.

According to an aspect of the invention, there is provided an apparatus for managing a storage space through time-variant consumption estimation, the apparatus including a storage unit storing contents in the storage space, a consumption estimation unit estimating time-variant consumption of the storage space, a contents management unit deleting at least a portion of the contents or storing at least a portion of additionally input contents according to the estimation result, and an output unit outputting the deletion or storage result.

According to another aspect of the invention, there is provided a method of managing a storage space through time-variant consumption estimation, the method including storing contents in a storage space, estimating time-variant consumption of the storage space, deleting at least a portion of the contents or storing at least a portion of additionally input contents according to the estimation result, and outputting the deletion or storage result.

BRIEF DESCRIPTION OF THE DRAWINGS

The above and other features and aspects of the present invention will become more apparent by describing in detail exemplary embodiments thereof with reference to the attached drawings, in which.

DESCRIPTION OF THE EXEMPLARY EMBODIMENTS

Aspects and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these embodiments are provided so that this disclosure will be thorough and complete and will fully convey the concept of the invention to those skilled in the art, and the present invention will only be defined by the appended claims and their equivalents. Same numeric reference refer to analogous elements throughout the specification.

Hereinafter, an exemplary embodiment of the invention will be described in detail.

Figure 1:
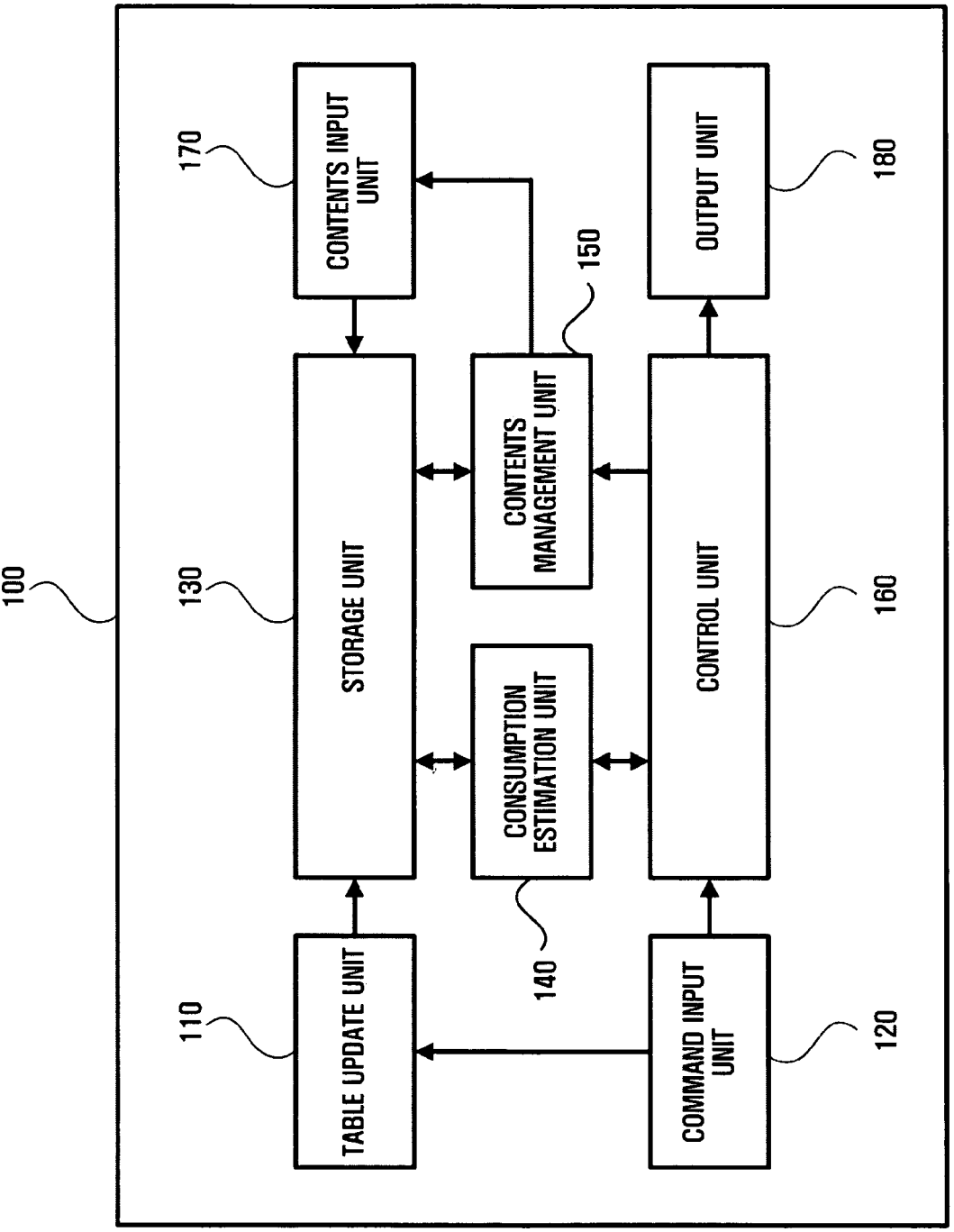
FIG. 1 is a block diagram showing an apparatus for managing a storage space through time-variant consumption estimation according to an exemplary embodiment of the invention.

FIG. 1 is a block diagram showing an apparatus for managing a storage space (hereinafter, referred to as storage space management apparatus) 100 through time-variant consumption estimation according to an exemplary embodiment of the invention. The storage space management apparatus 100 includes a table update unit 110, a command input unit 120, a storage unit 130, a consumption estimation unit 140, a contents management unit 150, a control unit 160, a contents input unit 170, and an output unit 180.

In the exemplary embodiment of the present invention, the term "unit" represents software and hardware constituent elements such as a field programmable gate array (FPGA), or an application specific integrated circuit (ASIC). The unit serves to perform some functions but is not limited to software or hardware. The unit may reside in an addressable memory. Alternatively, the unit may be provided to reproduce one or more processors. Therefore, examples of the unit include elements such as software elements, object-oriented software elements, class elements, and task elements, processes, functions, attributes, procedures, subroutines, segments of program code, drivers, firmware, microcode, circuits, data, databases, data structures, tables, arrays, and parameters. The elements and the units may be combined with other elements and units or divided into additional elements and units. In addition, the elements and the units may be provided to reproduce one or more central processing units (CPUs) in a device or a security multimedia card.

The storage unit 130 stores predetermined contents in an internal storage space. Here, the contents includes multimedia contents, document contents, and other digitalized data.

Further, the storage unit 130 can store a consumption estimation table indicating consumption of the storage space. The consumption estimation table includes a time, at which consumption of the storage space is changed as time passes, and consumption at the change time. The details of the consumption estimation table according to an exemplary embodiment of the present invention will be described below with reference to FIG. 2.

The storage unit 130 is a module, in which input/output of information is possible, such as a hard disk, a flash memory, a CF card (Compact Flash Card), an SD card (Secure Digital Card), an SM card (Smart Media Card), an MMC card (Multimedia Card), or a memory stick. The storage unit 130 may be provided in the storage space management apparatus 100 or may be provided in a separate apparatus.

The command input unit 120 receives a predetermined job command for the contents stored in the storage unit 130 or the contents transmitted through a network. To this end, the command input unit 120 can have an input unit, such as buttons, keyboard, a keypad, or a touch pad. The user can input the job command using the above-described input unit. Here, the job command is a command for a job that can have an effect on a change in consumption of the storage space, and includes storage, editing, deletion, reserved storage, reserved editing, and reserved deletion for the contents. In addition, information (hereinafter, referred to as reserved job information) on a reserved job, such as reserved storage, reserved editing, or reserved deletion is stored in the storage unit 130 so as to be used for a job for the contents.

The table update unit 110 updates the consumption estimation table according to a job requested by the user. That is, consumption at a specified time included in the consumption estimation table is added or deleted.

The consumption estimation unit 140 estimates time-variant consumption of the storage space in the storage unit 130 with reference to the consumption estimation table. Estimated consumption of the storage space varies as the job command of the user is input. For example, in a state where contents A is stored in the storage unit 130, when contents B, streaming data, is transmitted, consumption of the storage space is increased. Then, if the packet transmission of the contents B is completed, consumption of the storage space becomes the sum of the size of the contents A and the size of the contents B. Further, when packets of the contents B are being transmitted, a new contents C may be stored, or some parts or all parts of the previously stored contents A may be deleted.

That is, consumption of the storage space in the storage unit 130 varies as the job command of the user is input. This information is included in the consumption estimation table updated by the table update unit 110, and thus the consumption estimation unit 140 can estimate consumption of the storage space with reference to the consumption estimation table.

The contents management unit 150 performs a job for the contents stored in the storage unit 130 or the contents input through the network according to the estimation result. Here, the job includes storage, editing, deletion, reserved storage, reserved editing, and reserved deletion. The contents management unit 150 can simultaneously perform a plurality of jobs. For example, the contents management unit 150 can store the contents in the storage unit 130 according to a storage command of the user. During storage, the contents management unit 150 can store another reserved contents to be stored. Simultaneously, the contents management unit 150 can edit or delete the previously stored contents. Here, in order to perform the reserved job, the contents management unit 150 can refer to the reserved job information stored in the storage unit 130.

Meanwhile, when the contents are stored or reserved to be stored by the contents management unit 150, the contents to be stored is transmitted through the network. In this case, the contents input unit 170 receives the contents that is transmitted through the network. That is, the contents input unit 170 receives contents generated or stored by a separate device (not shown).

As a communication system between the contents input unit 170 and the separate device (contents generation device or contents storage device) (not shown), a wired communication system, such as Ethernet, a USB, IEEE 1394, serial communication, and parallel communication, or a wireless communication system, such as infrared communication, Bluetooth, Home RF, and a wireless LAN, can be used.

The control unit 160 checks whether or not consumption of the storage space estimated by the consumption estimation unit 140 exceeds a predetermined critical value. Here, the critical value can be set according to a maximum size of the storage space or user's assignment.

When estimated consumption does not exceed the critical value, the control unit 160 allows the contents management unit 150 to perform a job for the corresponding contents. When estimated consumption exceeds the critical value, the control unit 160 allows the output unit 180 to output information informing that estimated consumption exceeds the critical value.

Further, when estimated consumption exceeds the critical value, the control unit 160 can extract utilization schemes of the storage space. Here, the utilization schemes include deletion some parts or all parts of the contents previously stored in the storage unit 130, and change of a storage start time and a storage end time of contents to be stored. A plurality of utilization schemes can be extracted. These utilization schemes can be previously defined by the user and can be stored in the storage unit 130. Consequently, the storage space of the storage unit 130, in which the contents can be stored, can be a space, excluding spaces in which the consumption estimation table, the reserved job information, and the utilization schemes are stored.

In addition, the control unit 160 performs the overall control of the table update unit 110, the command input unit 120, the storage unit 130, the consumption estimation unit 140, the contents management unit 150, the contents input unit 170, the output unit 180, and the entire storage space management apparatus 100.

The output unit 180 outputs the job result for the contents according to a control command of the control unit 160. That is, when estimated consumption does not exceed the critical value, the output unit 180 outputs that the corresponding job for the contents is performed. When estimated consumption exceeds the critical value, the output unit 180 outputs the information informing that estimated consumption exceeds the critical value. In addition, the output unit 180 may output the utilization schemes of the storage space extracted by the control unit 160.

That is, at least one utilization scheme is output, and, when the utilization schemes are output, the user selects a desired utilization scheme among the output utilization schemes so as to input a selection command through the command input unit 120. Then, the table update unit 110 updates the consumption estimation table according to the job corresponding to the input selection command, and the contents management unit 150 performs the job for the contents according to the utilization scheme selected by the user.

The output unit 180 can output the job result for the contents or the utilization scheme by image or sound. To this end, the output unit 180 can include a display unit (not shown) and a sound output unit (not shown).

The display unit (not shown) is a module that includes an image display unit, such as a cathode ray tube (CRT), a liquid crystal display (LCD), a light-emitting diode (LED), an organic light-emitting diode (OLED), or a plasma display panel (PDP), which can display image signals. The display unit displays the job results or the utilization schemes.

The sound output unit (not shown) outputs sound signals. That is, the sound output unit converts an electrical signal including sound information into vibration, and generates longitudinal waves in air so as to copy sound waves. In general, a speaker can be used as the sound output unit (not shown).

The sound output unit (not shown) can convert electrical signals into sound waves using an electric type, an electromagnetic type, an electrostatic type, a dielectric type, or a magnetic deflection type.

Figure 2:
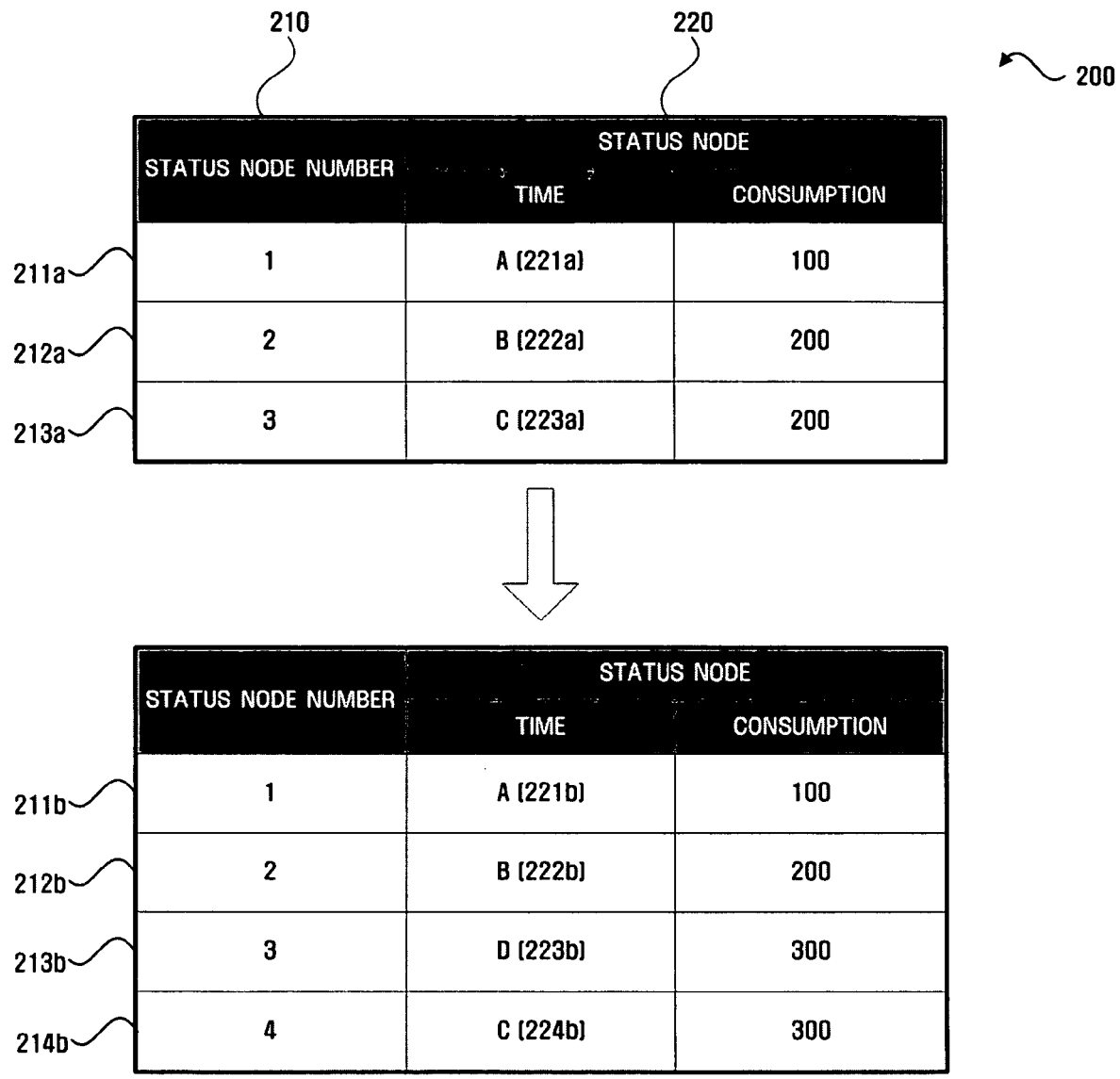
FIG. 2 is a diagram showing a consumption estimation table according to an exemplary embodiment of the invention.

FIG. 2 is a diagram showing a consumption estimation table according to an exemplary embodiment of the invention. The consumption estimation table 200 includes a status node number 210 and a status node 220. Here, the status node means a point that is determined by one time and consumption at that time on a two-dimensional plane having a time axis and a consumption axis.

That is, the status node number 210 means a sequence of time at which consumption is changed. For example, in a state where status node numbers 1, 2, and 3, indicated by 211a, 212a, and 213a, are given at time 221a, 222a, and 223a of A, B, and C, respectively, when a change in consumption of the storage space occurs at a time D between the time B 222a and the time C 223a, status node numbers 1, 2, 3, and 4, indicated by 211b, 212b, 213b, and 214b, are given at time A, B, D, and C 221b, 222b, 223b, and 224b, respectively.

Meanwhile, two kinds of consumption may exist at the same time. For example, when the storage, deletion, or editing of the contents is performed, as for consumption at a specified time, previous consumption and new consumption by the job may exist. At this time, different status nodes are formed at the same time, and status node numbers are given to the individual status nodes. That is, when the status nodes corresponding to the status node numbers are connected in sequence, it is possible to form a graph that shows a time-variant change in consumption on the above-described two-dimensional plane.

Figure 3:
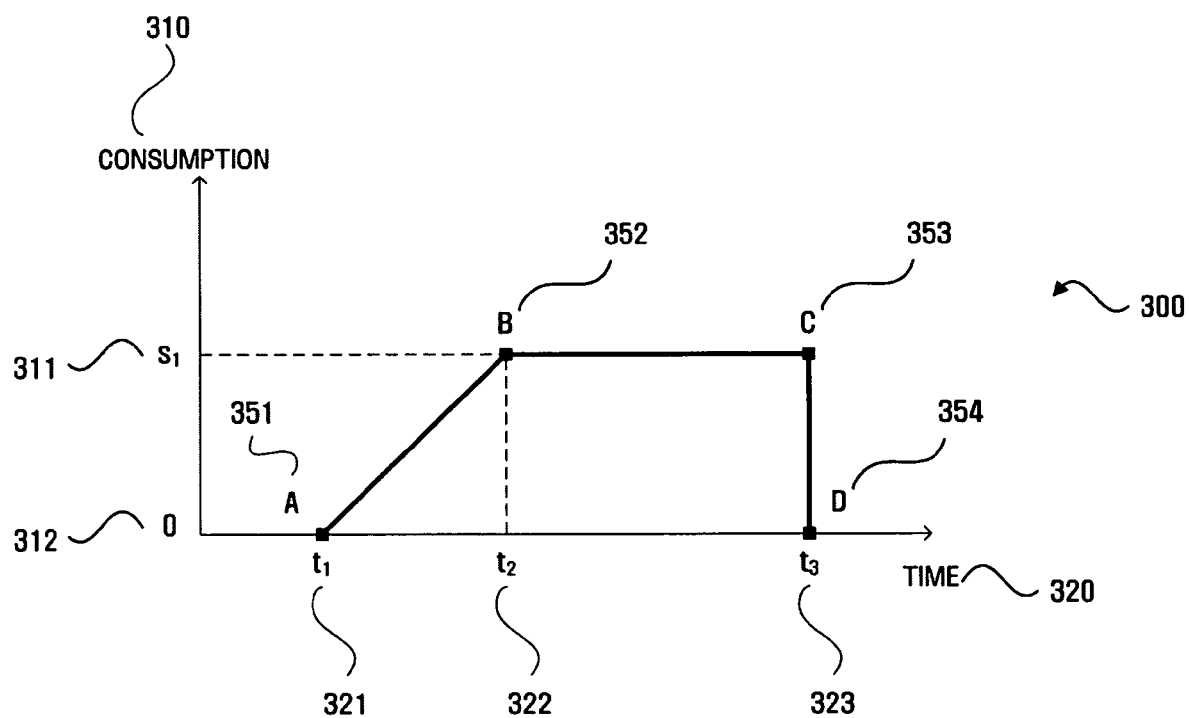
FIG. 3 is a graph showing a change in consumption using a consumption estimation table according to an exemplary embodiment of the invention.

FIG. 3 is a graph showing a change in consumption using a consumption estimation table according to an exemplary embodiment of the invention.

A graph showing a change in consumption (hereinafter, referred to as "consumption change graph") 300 can be expressed on the two-dimensional plane having a time axis 320 and a consumption axis 310 by connecting the status nodes included in the consumption estimation table 200 to one another in sequence.

FIG. 3 shows a consumption change graph 300 when contents that is transmitted by a streaming service is stored and deleted. FIG. 3 shows a consumption change graph according to four status nodes 351, 352, 353, and 354.

The status node A 351 is a status node at a time $t_1$ 321 at which the storage of the contents starts, and the consumption 312 at that time is 0 (zero). Accordingly, a coordinate of the status node A 351 becomes $(t_1, 0)$.

Then, as the streaming service proceeds, consumption of the storage space gradually increases. The status node B 352 is a status node at a time $t_2$ 322 at which the storage of the contents is completed, and the consumption 311 at that time is $s_1$. Accordingly, a coordinate of the status node B 352 becomes $(t_2, s_1)$.

A change in consumption from the status node A 351 to the status node B 352 may be irregular due to various causes, such as statuses of the network, kinds of the contents, and so on. In an exemplary embodiment of the invention, it is assumed that consumption increases at a constant level. That is, it is assumed that the status node A 351 and the status node B 352 are connected to each other by a line.

The status node C 353 is a status node at a time $t_3$ 323 at which the contents is deleted by the job command of the user, and the consumption 311 at that time is $s_1$. That is, a coordinate of the status node C 353 becomes $(t_3, s_1)$. Then, the status node D 354 is a status node at a time $t_3$ 323 at which the deletion of the contents is completed, and the consumption 312 at that time is 0 (zero). That is, a coordinate of the status node D 354 becomes $(t_3, 0)$.

Here, it can be seen that two kinds of consumption 311 and 312 exist at one time $t_3$ 323. Actually, if the contents is deleted, consumption of the storage space gradually decreases as time passes. However, in this invention, it is assumed that, if the deletion of the contents or the like is performed, the contents is completely removed at the same time. Because the elapsed time for deleting contents is short enough to be ignored. In addition, the status nodes for points where consumption is changed may exist separately.

Figure 4:
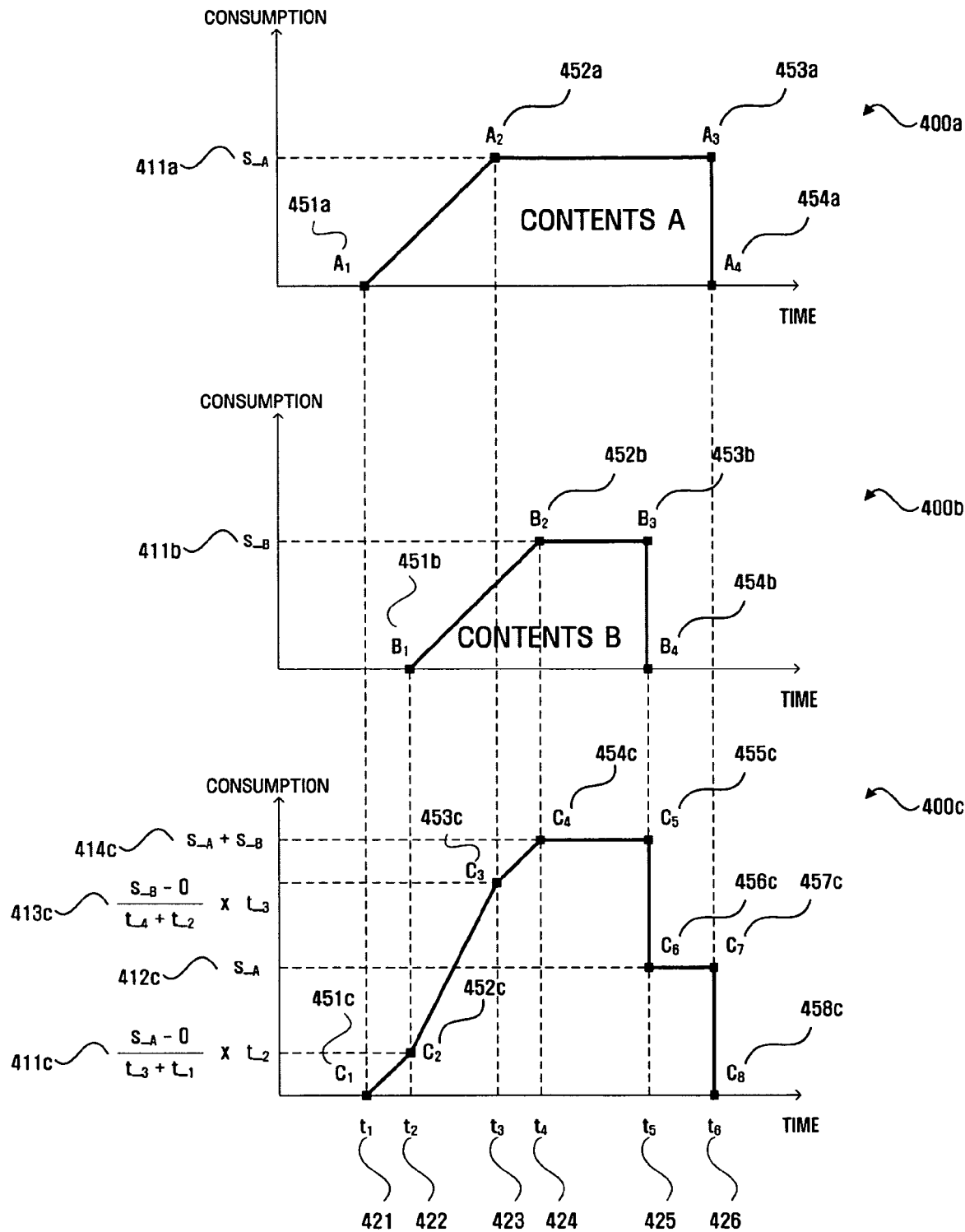
FIG. 4 is a graph showing a change in consumption according to an exemplary embodiment of the invention upon storage of contents.

FIG. 4 is a graph showing a change in consumption according to an exemplary embodiment of the invention upon storage of contents. Referring to FIG. 4, an entire storage space consumption change graph 400c is calculated using storage space consumption change graphs 400a and 400b by two contents.

As two contents having different storage start time are deleted at different time, changes in storage space consumption are formed. The change in an entire storage space consumption can be calculated by adding the changes in the storage space consumption.

The status nodes by the contents A include $A_1$ 451a, $A_2$ 452a, $A_3$ 453a, and $A_4$ 454a. The status node $A_1$ 451a represents a point where the storage of the contents starts, the status node $A_2$ 452a represents a point where the storage of the contents is completed, the status node $A_3$ 453a represents a point where the deletion of the contents starts, and the status node $A_4$ 454a represents a point where the deletion of the contents is completed. Here, it is assumed that the size of the contents A is $s\_A$ 411a.

Similarly, the status nodes by the contents B include $B_1$ 451b, $B_2$ 452b, $B_3$ 453b, and $B_4$ 454b. The status node $B_1$ 451b represents a point where the storage of the contents starts, the status node $B_2$ 452b represents a point where the storage of the contents is completed, the status node $B_3$ 453b represents a point where the deletion of the contents starts, and the status node $B_4$ 454b represents a point where the deletion of the contents is completed. Here, it is assumed that the size of the contents B is $s\_B$ 411b.

The status nodes in the entire storage space consumption change graph will now be described. That is, a status node $C_1$ 451c represents a storage start point of the contents A, a status node $C_2$ 452c represents a storage start point of the contents B, a status node $C_3$ 453c represents a storage end point of the contents A, and a status node $C_4$ 454c represents a storage end point of the contents B. Further, a status node $C_5$ 455c represents a deletion start point of the contents B, a status node $C_6$ 456c represents a deletion end point of the contents B, a status node $C_7$ 457c represents a deletion start point of the contents A, and a status node $C_8$ 458c represents a deletion end point of the contents A.

As described above, it is assumed that the deletion start time and the deletion end time of the contents are equal to each other. Therefore, the time of the status node $A_3$ 453a and the time of the status node $A_4$ 454a are equal to each other as $t_6$ 426, and the time of the status node $B_3$ 453b and the time of the status node $B_4$ 454b are equal to each other as $t_5$ 425.

As the contents A is stored at the time $t_1$ 421, consumption gradually increases. In this case, an increase ratio is a time-variant change in consumption, the following expression is established.

$$\frac{s\_A - 0}{t_3 - t_1}$$

Then, as the contents B is stored at the time $t_2$ 422, consumption gradually increases. That is, a consumption increase ratio by the contents B is expressed by the following expression.

$$\frac{s\_B - 0}{t_4 - t_2}$$

Here, since only the contents A is stored between the time $t_1$ 421 and the time $t_2$ 422, the increase ratio of storage space consumption is determined by a storage ratio of the contents A. Meanwhile, between the time $t_2$ 422 and the time $t_3$ 423, an increase ratio of storage space consumption is determined by the sum of a storage ratio of the contents A and a storage ratio of the contents B.

In the exemplary embodiment of the present invention, it is assumed that a line connecting the status nodes is a straight line, and thus consumption at the time $t_2$ 422 and consumption at the time $t_3$ 423 can be calculated using the increase ratios of storage space consumption of the contents A and the contents B. Consumption 411c at the time $t_2$ 422 can be determined by substituting the increase ratio of the contents A with the time $t_2$ 422, and consumption 413c at the time $t_3$ 423 can be determined by substituting the increase ratio of the contents B with the time $t_3$ 423. That is, consumption 411c at the status node $C_2$ 452c is expressed by the following expression.

$$\frac{s\_A - 0}{t_3 - t_1} \times t_2$$

Further, consumption 413c at the status node $C_3$ 453c is expressed by the following expression.

$$\frac{s\_B - 0}{t_4 - t_2} \times t_3$$

If the storage of the contents B is completed at the time $t_4$ 424, consumption 414c of the storage space at the status node $C_5$ 455c is determined by the sum of the size 411a of the contents A and the size 411b of the contents B.

The contents A and the contents B are deleted at specified time according to a reserved deletion command of the user. The time $t_5$ 425 is a time at which the contents B is deleted, and consumption after the deletion ends becomes the size 412c of the contents A. That is, consumption at the status node $C_6$ 456c is s_A 412c. Further, the time $t_6$ 426 is a time at which the contents A is deleted, and consumption after the deletion ends becomes 0 (zero).

As such, the entire storage space consumption change graph upon the storage of a plurality of contents can be calculated by the sum of the consumption change graphs of the individual contents.

According to the consumption change graph shown in FIG. 4, the consumption estimation table 200 is created and stored in the storage unit 130. Subsequently, when the user attempts to store another contents, consumption of the storage space at a specified time may exceed the critical value. At this time, the user can select one of the utilization schemes extracted by the control unit 160. Of these, editing for deletion a portion of the previously stored contents is performed, such that the storage space can be secured.

Figure 5:
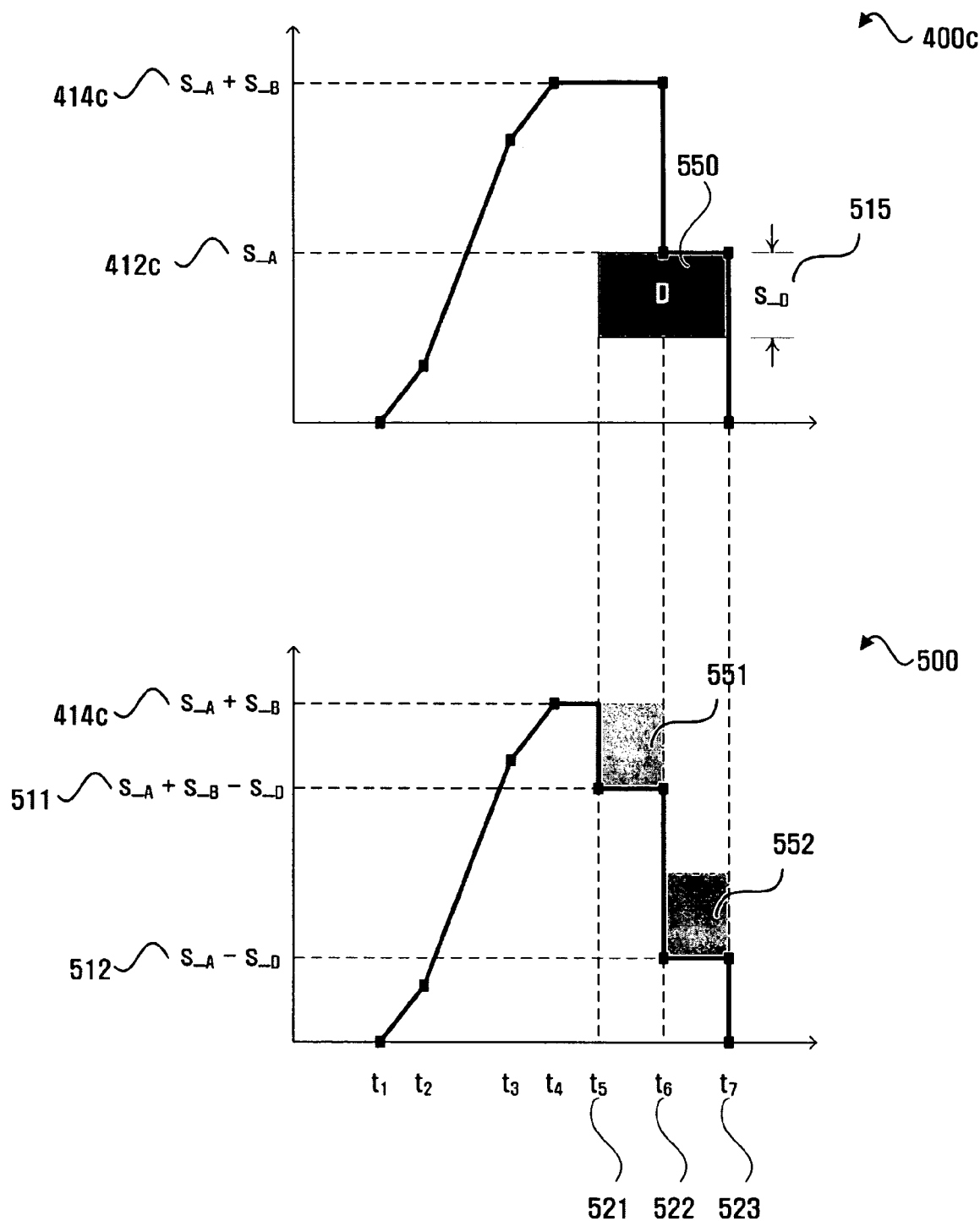
FIG. 5 is a graph showing a change in consumption according to an exemplary embodiment of the invention upon editing of contents.

FIG. 5 is a graph showing a change in consumption according to an exemplary embodiment of the invention upon editing of contents. FIG. 4 shows a consumption change graph 500 that is obtained by correcting the consumption change graph 400c determined by the storage and deletion of the contents A and the contents B according to the editing of the contents A.

In FIG. 5, a D area 550 is an area where the contents A is edited and deleted, and corresponds to consumption by $s\_D$ 515 from the time $t_5$ 521 to the time $t_7$ 523.

As a portion of the contents A is deleted, consumption 511 from the time $t_5$ 521 to the time $t_6$ 522 is obtained by subtracting s_D 515 from the sum 414c of the sizes of the contents A and the contents B. Further, consumption 512 from the time $t_6$ 522 to the time $t_7$ 523 is obtained by subtracting s_D 515 from the size 412c of the contents A.

As a result, as for entire storage space consumption after the time $t_5$ 521, storage spaces 551 and 552 by s_D 515 can be secured according to the editing of the contents A.

Figure 6:
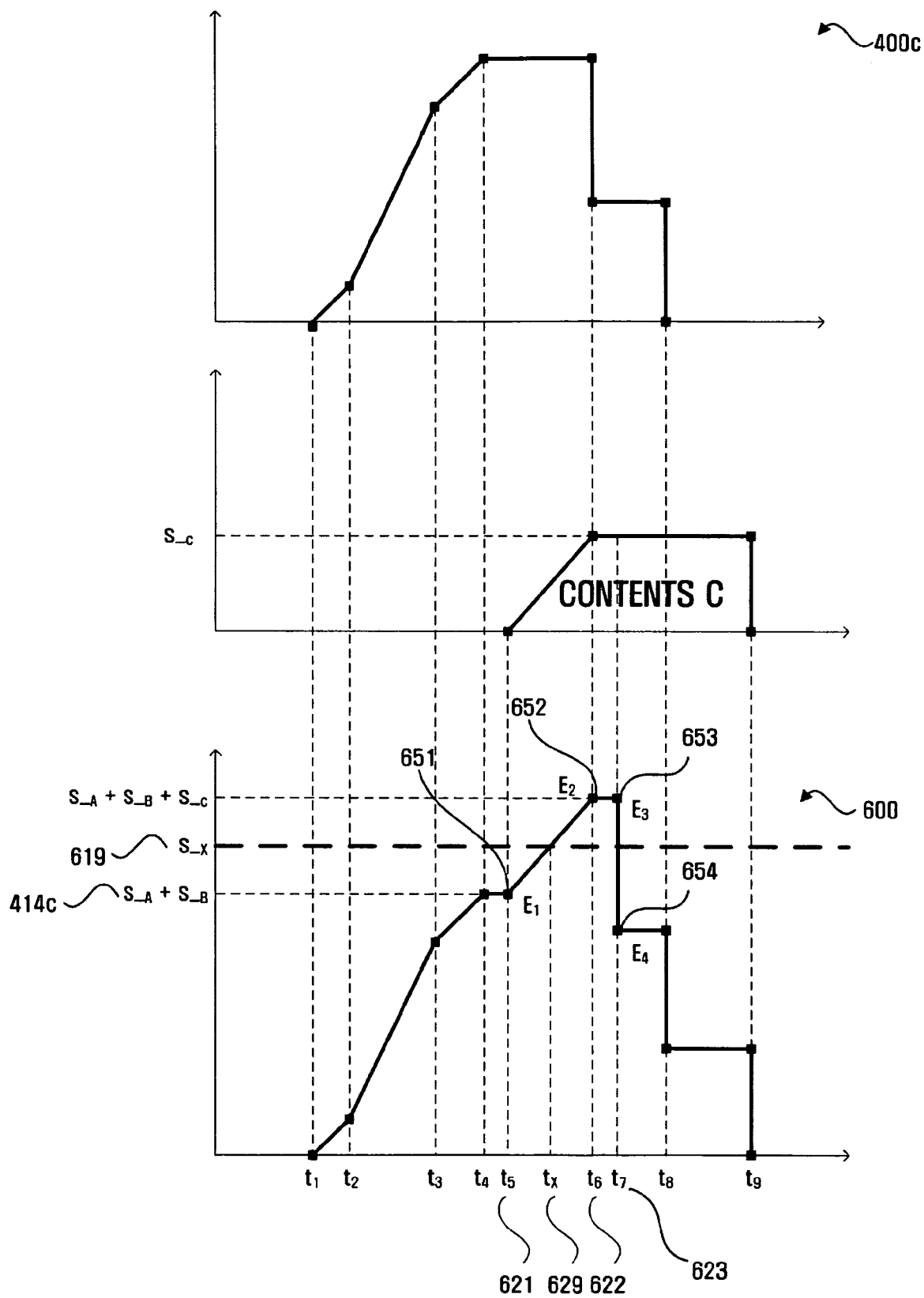
FIG. 6 is a graph showing a case where consumption of a storage space according to an exemplary embodiment of the invention exceeds a critical value.

FIG. 6 is a diagram showing a case where consumption of a storage space according to an exemplary embodiment of the invention exceeds a critical value. FIG. 4 shows a graph 600 showing a case where consumption of the storage space determined by the storage and deletion of the contents A and the contents B exceeds a critical value 619 according to storage of another contents C.

In FIG. 6, since a storage start time of the contents C is $t_5$ 621, and a storage end time thereof is $t_6$ 622, entire storage space consumption increase during the time. At this time, consumption of the storage space at a time $t_X$ 629 may exceed the critical value 619, and this is confirmed by the control unit 160.

The control unit 160 confirms whether or not any consumption in the consumption estimation table 200 exceeds the critical value 619. Here, by substituting an increase ratio between a status node $E_1$ 651 before excess and a status node $E_2$ 652 after excess, that is, an increase ratio of the contents C with the critical value $s\_X$ 619, the time $t_X$ 629 can be calculated. That is, the $t_X$ 629 is expressed by the following expression.

$$\frac{t_6 - t_5}{s\_C} \times s\_X$$

Similarly, the control unit 160 can confirm a time $t_7$ 623 at which the critical value excess of consumption is released. In the exemplary embodiment of the present invention, since it is assumed that consumption release of the contents by the deletion is performed simultaneously with the deletion, the control unit 160 can confirm that the critical value excess of consumption is released at the time $t_7$ 623 of the status node $E_3$ 653 or the status node $E_4$ 654.

Consequently, the control unit 160 can confirm the critical value excess time and release time. Accordingly, the deletion or editing of the previously stored contents, or a notice of the utilization scheme to the user and a job according to a user's request can be performed.

Figure 7:
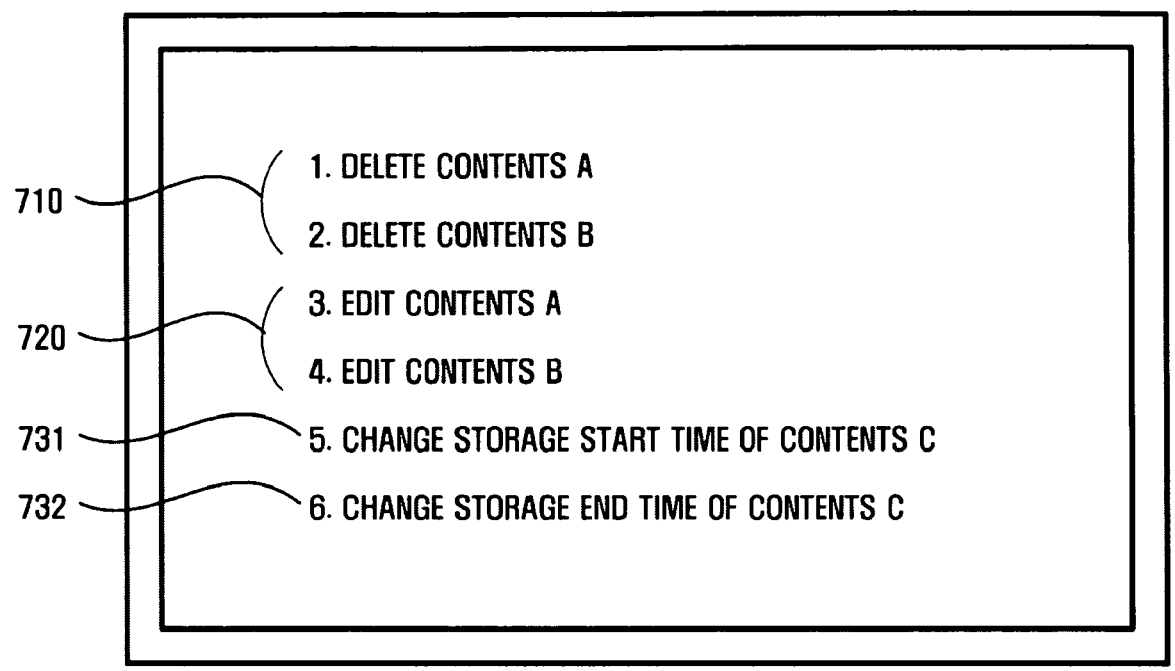
FIG. 7 is a diagram showing a case where utilization schemes according to an exemplary embodiment of the invention are displayed.

FIG. 7 is a diagram showing a case where utilization schemes according to an exemplary embodiment of the invention are displayed. In FIG. 7, the utilization schemes extracted by the control unit 160 are displayed through the display unit (not shown).

As the utilization schemes of the storage space, deletion 710 of the previously stored contents, editing 720 of the previously stored contents, change 731 of a storage start time of a contents to be newly stored (contents C), or change 732 of a storage end time of the contents (contents C) to be newly stored can be used.

For example, if the user selects the deletion of the contents A among the utilization schemes, the table update unit 110 updates consumption estimation table 200 in a state where the contents A is deleted. Then, the control unit 160 allows the contents management unit 150 to delete the contents A, such that the contents C to be newly stored can be normally stored.

Meanwhile, the storage space of the storage unit 130 can be secured according to the change of the storage start time or the storage end time of the contents C to be newly stored. For example, as shown in FIG. 6, when consumption exceeds the critical value 619, the storage space can be secured by setting the storage start time of the contents C to the time $t_7$ 623.

Further, the control unit 160 can secure the storage space of the storage unit 130 by editing the previously stored contents. The details of the exemplary contents editing are described above with reference to FIG. 5, and thus they will be omitted.

FIG. 7 shows that the utilization schemes are displayed through the display unit (not show), but the utilization schemes may be output by sound through the sound output unit (not shown), as described above.

Figure 8:
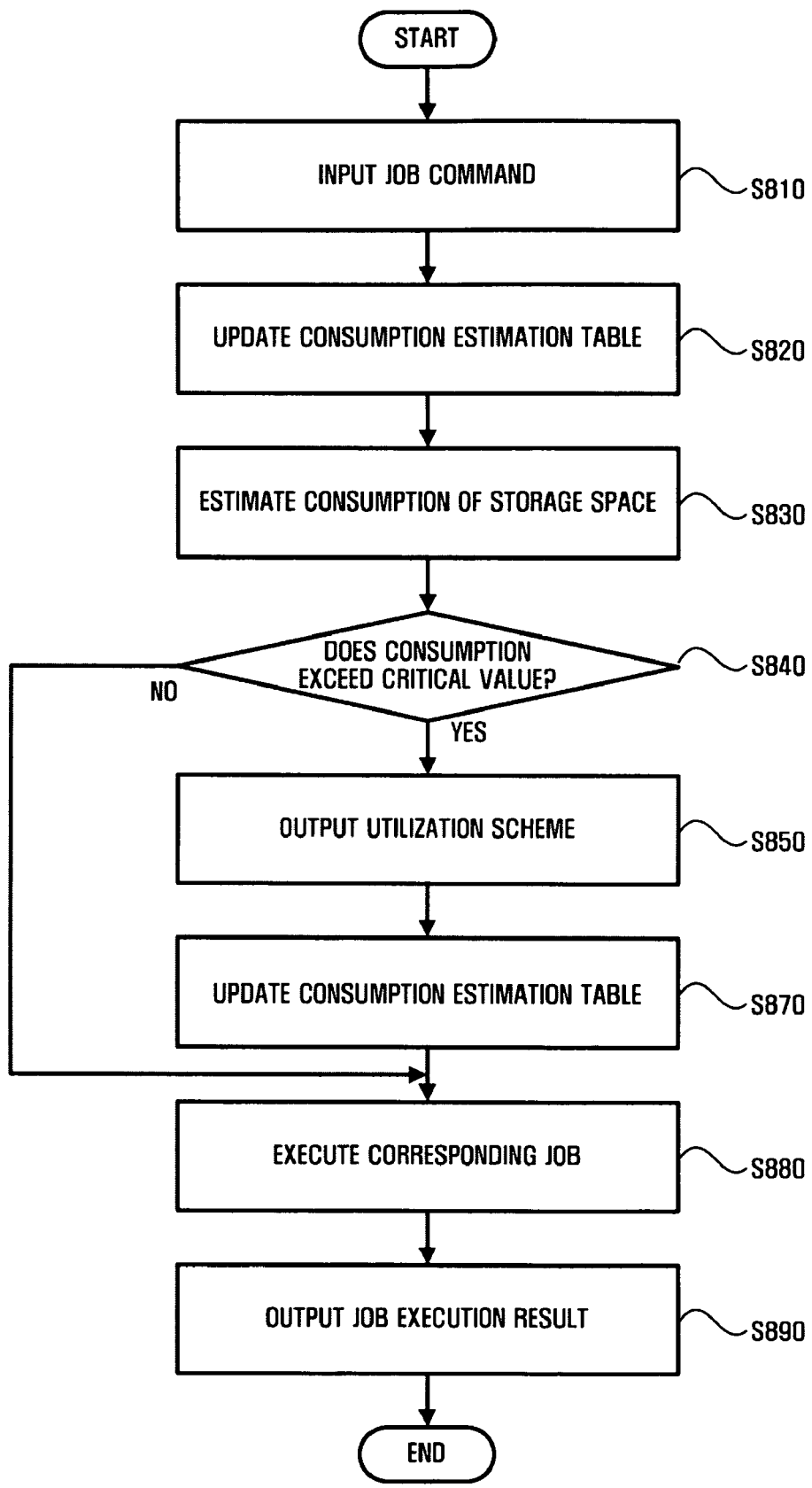
FIG. 8 is a flowchart showing a process of managing a storage space through time-variant consumption estimation according to an exemplary embodiment of the invention.

FIG. 8 is a flowchart showing a process of managing a storage space through time-variant consumption estimation according to an exemplary embodiment of the invention.

In order to manage the storage space of the storage unit 130, the command input unit 120 of the storage space management apparatus 100 first receives a predetermined job command for the contents stored in the storage unit 130 or the contents transmitted through the network, using an input unit, such as buttons, the keyboard, a keypad, or a touch pad (Operation S810). Here, the job command includes storage, editing, deletion, reserved storage, reserved editing, and reserved deletion of the contents.

The input job command is transmitted to the table update unit 110, and the table update unit 110 updates the consumption estimation table 200 according to a job requested by the user (Operation S820). Here, the consumption estimation table 200 includes a time at which consumption of the storage space is changed as time passes, and consumption at the change time.

Then, the consumption estimation unit 140 estimates time-variant consumption of the storage space of the storage unit 130 with reference to the updated consumption estimation table 200 (Operation S830).

Estimated consumption is transmitted to the control unit 160, and the control unit 160 checks whether estimated consumption exceeds the critical value (Operation S840). Then, when estimated consumption does not exceed the critical value, the control code corresponding to the job command of the user is transmitted to the contents management unit 150. Meanwhile, when estimated consumption exceeds the critical value, the utilization scheme is extracted from the storage unit 130 and is transmitted to the output unit 180. The critical value can be determined according to the maximum size of the storage space or user's assignment.

The contents management unit 150 that receives the control code from the control unit 160 performs the corresponding job (Operation S880). That is, storage, editing, or deletion of the contents is performed. When the corresponding job is a reserved job, the job is performed after stand-by to the corresponding time.

Meanwhile, when estimated consumption exceeds the critical value, and when the utilization scheme is transmitted to the output unit 180, the output unit 180 outputs the utilization scheme by image or sound (Operation S850).

Accordingly, the user can select one of the output utilization schemes. Then, the table update unit 110 updates the consumption estimation table 200 again (Operation S870), the control unit 160 transmits the control code for the corresponding job to the contents management unit 150, and the contents management unit 150 performs the corresponding job (Operation S880).

Further, the output unit 180 can output information informing that the job by the contents management unit 150 is performed (Operation S890).

Although the present invention has been described in connection with the exemplary embodiments of the present invention, it will be apparent to those skilled in the art that various modifications and changes may be made thereto without departing from the scope and spirit of the invention. Therefore, it should be understood that the above embodiments are not limitative, but illustrative in all aspects.

According to the apparatus and the method of managing a storage space through time-variant consumption estimation of an exemplary embodiment of the invention, the storage space management apparatus that can store and output the contents estimates consumption of the storage space in advance, provides the user with information on that the storage space is to be lacking at which time or period, and allows the user to plan the utilization of the storage space.

What is claimed is:

1. An apparatus for managing a storage space through time-variant consumption estimation, the apparatus comprising:
    a storage unit which stores contents in the storage space;
    a consumption estimation unit which estimates time-variant consumption of the storage space at times of changing the storage space;
    a contents management unit which deletes at least a portion of the contents or which stores at least a portion of additionally input contents according to the estimation result; and
    an output unit which outputs the deletion or storage result.

2. The apparatus of claim 1, wherein a consumption estimation table comprises consumption at the change times.

3. The apparatus of claim 2, wherein the storage unit stores the consumption estimation table.

4. The apparatus of claim 2, further comprising a table update unit which updates the consumption estimation table according to a deletion or storage command requested by a user.

5. The apparatus of claim 1, wherein the contents management unit performs at least one of storage, editing, deletion, reserved storage, reserved editing, and reserved deletion.

6. The apparatus of claim 1, further comprising a control unit which checks whether estimated consumption exceeds a predetermined critical value.

7. The apparatus of claim 6, wherein the critical value is determined according to a maximum size of the storage space or user's assignment.

8. The apparatus of claim 6, wherein the control unit extracts utilization schemes of the storage space when estimated consumption exceeds the critical value.

9. The apparatus of claim 8, wherein the utilization schemes comprise at least one of deletion of the stored contents, editing of the stored contents, change of a storage start time of the additionally input contents, and change of a storage end time of the additionally input contents.

10. The apparatus of claim 8, wherein the output unit outputs the utilization schemes by image or sound.

11. The apparatus of claim 8, wherein the contents management unit deletes at least a portion of the contents or stores at least a portion of the additionally input contents according to a utilization scheme selected by a user from the utilization schemes.

12. A method for managing a storage space through time-variant consumption estimation, the method comprising:
    storing contents in a storage space;
    estimating time-variant consumption of the storage space at times of changing the storage space;
    deleting at least a portion of the contents or storing at least a portion of additionally input contents according to the estimation result; and
    outputting the deletion or storage result.

13. The method of claim 12, wherein a consumption estimation table comprises consumption at the change times.

14. The method of claim 13, wherein the storing comprises storing the consumption estimation table.

15. The method of claim 13, further comprising updating the consumption estimation table according to a deletion or storage command requested by a user.

16. The method of claim 12, wherein the deleting or storing comprises performing at least a portion of storage, editing, deletion, reserved storage, reserved editing, and reserved deletion of the contents.

17. The method of claim 12, further comprising checking whether estimated consumption exceeds a predetermined critical value.

18. The method of claim 17, wherein the critical value is determined according to a maximum size of the storage space or user's assignment.

19. The method of claim 17, wherein the checking comprises extracting utilization schemes of the storage space when estimated consumption exceeds the critical value.

20. The method of claim 19, wherein the utilization schemes comprise at least one of deletion of the stored contents, editing of the stored contents, change of a storage start time of the additionally input contents, and change of a storage end time of the additionally input contents.

21. The method of claim 19, wherein the outputting comprises outputting the utilization schemes by image or sound.

22. The method of claim 19, wherein the deleting or storing comprises deleting at least a portion of the contents or storing at least a portion of the additionally input contents according to a utilization scheme selected by a user from the utilization schemes.

23. The apparatus of claim 1, wherein the consumption estimation unit calculates the time-variant consumption when a user inputs a job command.

24. The apparatus of claim 1, wherein the utilization schemes comprise at least one of changing of storage start time of the additionally input contents and changing of storage end time of the additionally input contents.

* * * * *